United States Patent
Sahni et al.

(10) Patent No.: US 11,657,399 B1
(45) Date of Patent: May 23, 2023

(54) VALUE-ADDED SERVICES PROVIDED IN A SEAMLESS LIFE FORMAT

(71) Applicant: Wells Fargo Bank, N.A., Charlotte, NC (US)

(72) Inventors: Bipin Sahni, Pleasanton, CA (US); Matthew Martinez, San Francisco, CA (US); Melody Kao, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1803 days.

(21) Appl. No.: 14/876,153

(22) Filed: Oct. 6, 2015

(51) Int. Cl.
*G06Q 10/00* (2023.01)
*G06Q 20/40* (2012.01)
*H04L 67/306* (2022.01)
*H04W 12/06* (2021.01)
*H04W 4/021* (2018.01)
*H04L 67/53* (2022.01)
*H04L 67/50* (2022.01)

(52) U.S. Cl.
CPC ....... *G06Q 20/4014* (2013.01); *H04L 67/306* (2013.01); *H04L 67/53* (2022.05); *H04L 67/535* (2022.05); *H04W 4/021* (2013.01); *H04W 12/06* (2013.01)

(58) Field of Classification Search
USPC ........................................................ 705/7.13
See application file for complete search history.

(56) References Cited

U.S. PATENT DOCUMENTS

| | | | | |
|---|---|---|---|---|
| 7,236,976 | B2* | 6/2007 | Breitenbach | G06Q 10/06311 |
| | | | | 707/999.102 |
| 8,135,624 | B1 | 3/2012 | Ramalingam et al. | |
| 8,645,182 | B2* | 2/2014 | Johnson | G06Q 10/109 |
| | | | | 705/7.18 |
| 9,378,491 | B1* | 6/2016 | Grassadonia | G06Q 10/107 |
| 11,196,747 | B2* | 12/2021 | Lee | G06Q 20/10 |
| 2004/0268215 | A1* | 12/2004 | Trossen | H04L 67/01 |
| | | | | 455/418 |

(Continued)

OTHER PUBLICATIONS

Yeomans, Mike, What Every Manager Should Know About Machine Learning, Jul. 7, 2015, Harvard Business Review, https://hbr.org/2015/07/what-every-manager-should-know-about-machine-learning, p. 1-7. (Year: 2015).*

(Continued)

*Primary Examiner* — Joseph M Waesco
(74) *Attorney, Agent, or Firm* — Kilpatrick Townsend & Stockton LLP

(57) ABSTRACT

Value-added services that allow for a seamless integration of actions related to activities and/or events are provided. A determination is made that an event has started based on scheduled event data or historical information associated with a user. Profile data associated with the user is identified based on the start of the first event. The identity of the user is verified based on a mapping between the profile data and data related to the first event. Further, an activity related to a second event is triggered after completion of a transaction of the first event is completed. A suggested action may be activated based on the trigger event. The suggested action is based on historical information associated with the user and is not a component of the first event or the second event.

18 Claims, 9 Drawing Sheets

(56) References Cited

U.S. PATENT DOCUMENTS

| | | | |
|---|---|---|---|
| 2010/0100617 A1* | 4/2010 | Rossi | H04L 67/306 709/224 |
| 2011/0238517 A1* | 9/2011 | Ramalingam | G06Q 20/20 705/16 |
| 2013/0073454 A1* | 3/2013 | Busch | H04W 4/029 455/456.3 |
| 2013/0290055 A1* | 10/2013 | Konchitsky | G06Q 10/06314 705/7.18 |
| 2013/0290188 A1* | 10/2013 | Olliphant | G06Q 20/3223 705/44 |
| 2014/0012743 A1* | 1/2014 | Hanson | G06Q 30/04 705/40 |
| 2014/0082097 A1 | 3/2014 | Athale et al. | |
| 2014/0115498 A1 | 4/2014 | Jackson et al. | |
| 2014/0222597 A1 | 8/2014 | Nadella et al. | |
| 2014/0235276 A1* | 8/2014 | Lefkowitz | G06Q 10/1095 455/456.3 |
| 2014/0249379 A1* | 9/2014 | Proud | A61B 5/0015 600/301 |
| 2014/0279111 A1 | 9/2014 | Mahaffey et al. | |
| 2014/0279123 A1 | 9/2014 | Harkey et al. | |
| 2014/0279270 A1 | 9/2014 | Bertanzetti et al. | |
| 2014/0350975 A1* | 11/2014 | Paperno | G06Q 10/02 705/5 |
| 2015/0012467 A1* | 1/2015 | Greystoke | G06Q 30/0619 706/12 |
| 2015/0019642 A1* | 1/2015 | Wang | G06Q 50/01 709/204 |
| 2015/0254645 A1* | 9/2015 | Bondesen | G06Q 20/385 705/41 |
| 2015/0287015 A1* | 10/2015 | Kaplinger | G06Q 20/227 705/39 |
| 2016/0094963 A1* | 3/2016 | Gupta | G06Q 50/01 705/7.19 |
| 2017/0031449 A1* | 2/2017 | Karsten | G06F 1/163 |
| 2017/0070524 A1* | 3/2017 | Bailey | H04L 67/303 |
| 2017/0070525 A1* | 3/2017 | Bailey | H04L 43/16 |
| 2018/0083943 A1* | 3/2018 | Bowman | H04L 63/08 |
| 2019/0182257 A1* | 6/2019 | Lee | H04L 9/50 |
| 2021/0256521 A1* | 8/2021 | Ding | G06N 20/00 |
| 2022/0027921 A1* | 1/2022 | Handelman | G06Q 20/4093 |

OTHER PUBLICATIONS

Jon Azen, Ian Brettell, Laurence Lundblade, Giridhar D. Mandyam, and Mike Milikich, Multifactor Authentication based on User Contextual Data and the Mobile Web.

* cited by examiner

VALUE-ADDED SERVICES PROVIDED IN A SEAMLESS LIFE FORMAT

BACKGROUND

Advances in communication technology has allowed businesses and individuals to perform transactions online (e.g., over the Internet), including financial transactions. Further, financial institutions may have relationships with both customers (e.g., individuals and businesses) and merchants (e.g., providers of goods and/or services) that perform online transactions. In daily interactions, a user (e.g., a customer) may perform multiple interactions with one or more merchants. On the user side, the multiple interactions may be cumbersome and it may be difficult to find a suitable merchant. On the merchant side, marketing to potential customers using targeted advertisements may be expensive and hard to implement. On the financial institution side, leveraging existing relationships between customers and merchants has been non-existent.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

An aspect relates to a system that includes a processor that executes computer executable components stored in a memory. The computer executable components may include an event manager that determines commencement of a first event based on scheduled event data or historical information associated with an identity of a user. The computer executable components may also include an evaluation manager that identifies profile data associated with the identity of the user based on the commencement of the first event and an authenticator that selectively verifies the identity of the user based on a mapping between the profile data and data related to the first event. Further, the computer executable components may include an action manager the triggers an activity associated with a second event after effecting completion of a transaction at the first event.

Another aspect relates to a method that includes receiving, by a system comprising a processor, a trigger event that relates to initiation of a first activity. The method may also include authenticating, by the system, the identity of the user for the first activity based on an expected match between the profile and data related to the first activity. Further, the method may include activating, by the system, an action associated with the first activity based on the authenticating. The action may be associated with a third party and the activating may be performed without user interaction. The method may also include triggering, by the system, a second activity based on the activating. The triggering may be performed without user interaction.

A further aspect relates to a computer-readable storage device storing executable instructions that, in response to execution, cause a system comprising a processor to perform operations. The operations may include determining a start of a first event based on scheduled event data or historical information associated with an identity of a user. The operations may also include identifying profile data associated with the identity of the user based on the start of the first event. Further, the operations may include verifying the identity of the user based on a mapping between the profile data and data related to the first event. The operations may also include triggering an activity associated with a second event after effecting completion of a transaction at the first event.

According to an implementation, the operations may include activating on a user device a suggested action based on the trigger event. The suggested action might not be a component of the first event or the second event and might be based on historical information associated with the identity of the user. Alternatively or additionally, the operations may include performing a monetary exchange from an account associated with the identity of the user and into another financial account associated with a third party associated with the first event.

To the accomplishment of the foregoing and related ends, certain illustrative aspects of the innovation are described herein in connection with the following description and the annexed drawings. These aspects are indicative, however, of but a few of the various ways in which the principles of the innovation may be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Various non-limiting embodiments are further described with reference to the accompanying drawings in which.

DETAILED DESCRIPTION

The innovation is now described with reference to the drawings. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

The various aspects disclosed herein provide value-added services in a seamless life format. Thus, various portions of actions (or events) that a user encounters or performs on a daily basis may be performed seamlessly (e.g., without the user needing to take action, or only needing to take action on a small portion of the action). For example, a behavior pattern of the user may be evaluated based on a user profile, credit card usage, and other historical data. As a result of the evaluation and based on a trigger event, a recommendation or automatic implementation of a next (or subsequent) event or action may be performed. The action or event might be pre-authenticated and/or pre-authorized without the user having to pull their mobile device out of their pocket or purse and searching for details of the next action or event. Further, the user does not need to get out their wallet in order to make payment at a restaurant, pay for a product or service, provide identification, and so on. In such a manner, the user does not have to think about trivial tasks and might instead focus on more important matters (e.g., engaging in conversation, enjoying an evening out, getting to a place on time, and so forth). Thus, the various aspects discussed herein may make life simpler for the user and may allow the user to take advantage of technology for the user's benefit.

Figure 1:
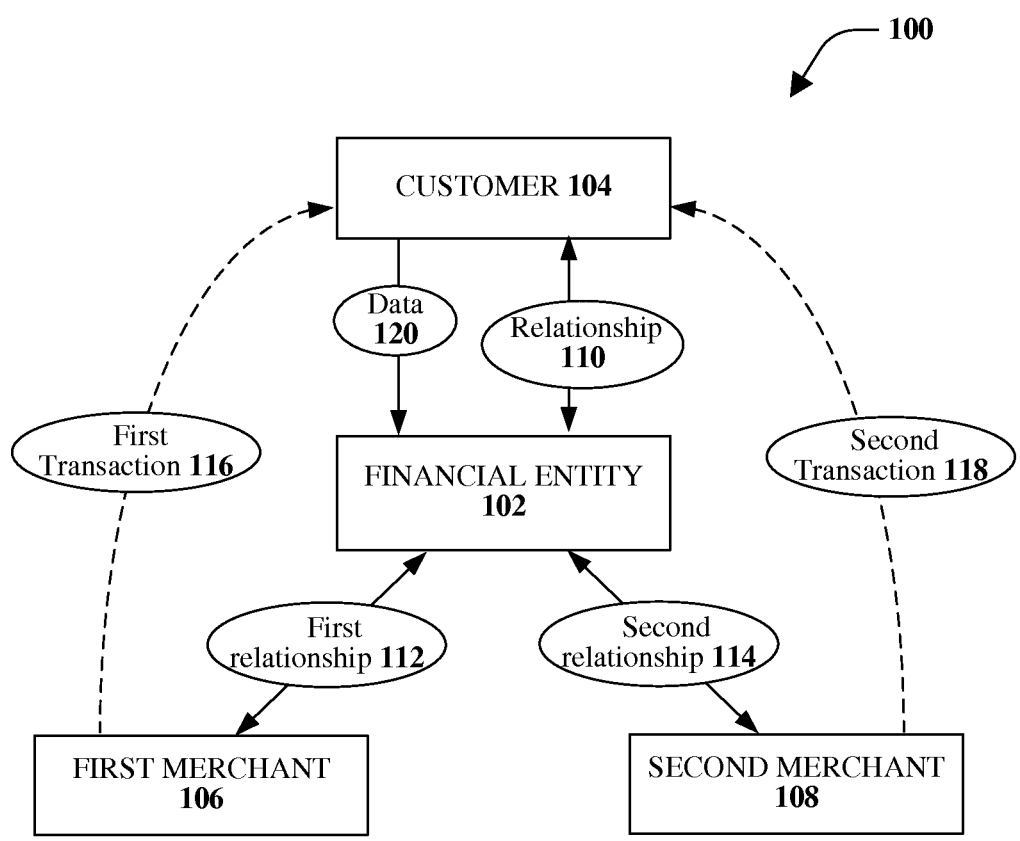
FIG. 1 illustrates an example, non-limiting schematic representation of relationships between entities in order to provide a seamless life, according to an aspect.

FIG. 1 illustrates an example, non-limiting schematic representation 100 of relationships between entities in order to provide a seamless life, according to an aspect. Illustrated are a financial entity 102, a customer 104, a first merchant 106 and a second merchant 108. Although illustrated as a single customer 104 and two merchants (first merchant 106 and second merchant 108) for purposes of simplicity, there may be more than one customer 104 and more than two merchants, according to various implementations.

As used herein an "entity" or a "financial entity" refers to a financial institution, such as a bank, persons operating on behalf of the financial institution, and/or communication devices managed by the financial institution and/or the persons operating on behalf of the financial institution. Additionally or alternatively, the entity may be a third party monitoring source or another type of entity that has a trusted relationship with the financial institution.

Further, the customer 104 may alternatively be referred to as a "user." Thus, as used herein a "user" refers to a customer of the financial institution and/or one or more devices managed by the customer. A "merchant" may be a person, partnership, or corporation engaged in commerce, manufacturing, law, finance, services, or other types of activities. Such merchants may be in the form of a sole proprietor, a corporation, a limited liability partnership, or another form of business that engages in commerce. Further, the merchant may be a for-profit business or a not-for-profit business.

The financial entity 102 may have a relationship 110 (e.g., a financial relationship) with the customer 104, the first merchant 106, and the second merchant 108. For example, the customer 104 may have a financial account 110 that is serviced by the financial entity 102. Examples of financial accounts include, but are not limited to, a savings account, a checking account, a certificate of deposit, a money market account, a mortgage, a loan, investments, insurance, debit card, credit card, and so on.

The financial entity 102 may have a first relationship 112 with the first merchant 106 and a second relationship 114 with the second merchant 108 (and subsequent relationships with subsequent merchants). The relationships 112, 114 may be based on financial relationships that relate to respective financial accounts owned by the merchants 106, 108 and serviced by the financial entity 102. Thus, either or both of the merchants 106, 108 may also be a customer of the financial entity 102, according to some implementations.

Additionally or alternatively, the merchants 106, 108 may have respective financial relationship with the financial entity 102 without being a customer of the financial entity 102. Thus, there may be a business relationship between the financial entity 102 and the first merchant 106 and/or the second merchant 108 based on the various aspects disclosed herein. For example, a merchant may provide an incentive in order for the financial entity 102 to provide (e.g., recommend, automatically implement, and so on) goods and/or service offered by the respective merchant to the customer 104, which may economically benefit both the merchant and the financial entity.

In order to provide value-added services to the customer 104 and the merchants 106, 108, the financial entity 102 may be configured to leverage its financial relationships as discussed herein. Thus, based on the financial relationships and/or information that the financial entity 102 knows about the customer 104, the first merchant 106 and the second merchant 108 there may be a direct link established between the customer 104 and the merchants 106, 108. Accordingly, the first merchant 106 may perform a first transaction 116 with the customer 104 and the second merchant 108 may perform a second transaction 118 with the customer 104.

It is noted that in accordance with one or more implementations described in this disclosure, users may need to opt-into the value-added services provided by the financial entity 102. Thus, one or more users may opt-out of providing personal information, demographic information, location information, proprietary information, sensitive information, or the like in connection with data gathering aspects. Moreover, one or more implementations described herein may provide for anonymizing collected, received, and/or transmitted data. Further, a user may opt-out of providing information at any time, regardless of whether the user previously opted-in to providing the information.

For example, various data 120 related to the customer 104 (that has requested to use the value-added services) is collected. Such data 120 may include, but is not limited to, transaction history (e.g., details of items purchased, date purchased, reviews of product/service purchased, and so forth), social media (e.g., likes, dislikes, comments, planned events, and so forth), as well as other information. The collected data 120 may be analyzed and cross-referenced with reservations, geolocation, and so on, to facilitate automatic triggering of events associated with the purchases, as well as potential additional purchases related to the events. The additional purchases may be a function of past transactions for the customer, for example. The data 120 may also include the customer's geolocation and mobile device identification, which may be used to seamlessly authenticate the customer for purchases. For example, the customer's geolocation may be compared with expected location based on the events. Additionally, payment for one event may trigger the automatic execution of a next (or subsequent) event.

For example, if a customer has made reservations for dinner followed by an evening at the theater, the customer may pay for dinner without taking her credit card out of her wallet. Rather, payment (and gratuity, based on user settings or based on user input) may be automatically provided to the restaurant (e.g., the first merchant 106) at the end of the meal. The user may be authenticated because the customer is at the expected restaurant with a strongly bound mobile device (or based on other parameters). The payment at the restaurant may trigger a reserved car service (e.g., the second merchant 108) to be sent to the restaurant to take the customer to the theatre. The financial institution may have knowledge about the customer's plan for the evening and, thus, may coordinate the entire process based on the transaction information.

According to some implementations, the customer 104 may have a prior relationship with the merchants 106, 108. Thus in the above example, the customer 104 may have previously ate at the restaurant and/or may have previously used the reserved car service. However, in some implementations, there is no preexisting relationship between the customer and one or more of the merchants.

Figure 2:
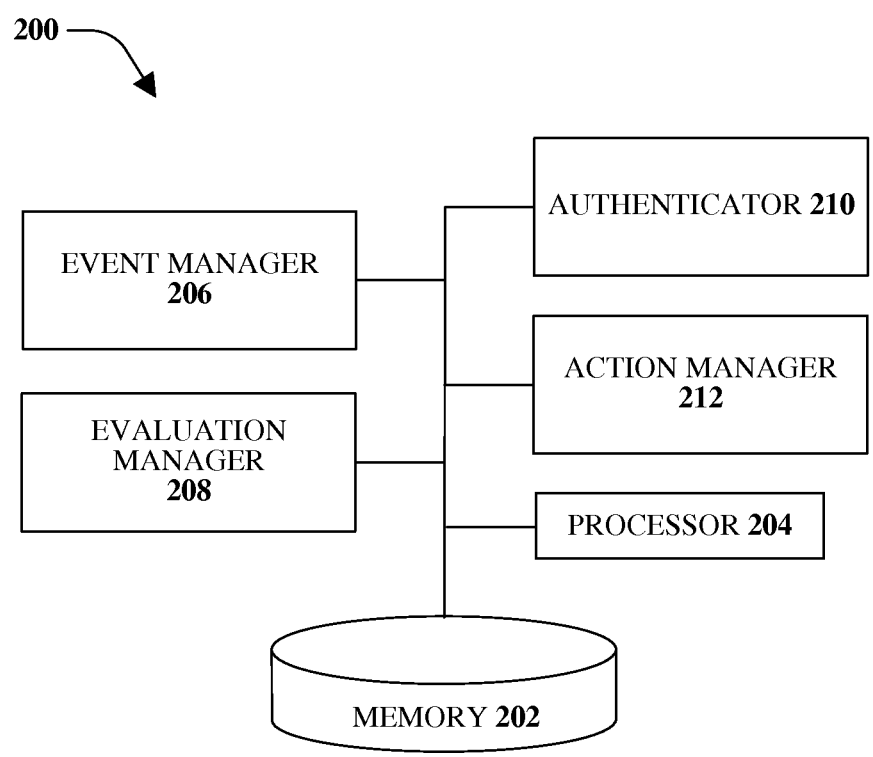
FIG. 2 illustrates an example, non-limiting system configured to provide value-added services in a seamless life format, according to an aspect.

FIG. 2 illustrates an example, non-limiting system 200 configured to provide value-added services in a seamless life format, according to an aspect. The system 200 may include at least one memory 202 that may store computer executable components and/or computer executable instructions. The system 200 may also include at least one processor 204, communicatively coupled to the at least one memory 202. The at least one processor 204 may facilitate execution of the computer executable components and/or the computer executable instructions stored in the memory 202. The term "coupled" or variants thereof may include various communications including, but not limited to, direct communications, indirect communications, wired communications, and/or wireless communications.

It is noted that although the one or more computer executable components and/or computer executable instructions may be illustrated and described herein as components and/or instructions separate from the memory 202 (e.g., operatively connected to the memory 202), the various aspects are not limited to this implementation. Instead, in accordance with various implementations, the one or more computer executable components and/or the one or more computer executable instructions may be stored in (or integrated within) the memory 202. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple components and/or as multiple instructions without departing from the example embodiments.

The system may also include an event manager 206 that may be configured to determine commencement of a first event. The determination by the event manager 106 may be based on scheduled event data and/or historical information associated with an identity of a user (e.g., the customer 104 of FIG. 1). For example, the user may utilize a calendar application on their mobile device to schedule an event (e.g., going to a sporting event). In another example, the user may utilize a social media application to get together with friends (e.g., at the sporting event, for happy hour after work, and so on). Other interactions may also be performed through utilization of the mobile device, which may also be passive interactions (e.g., location tracking). Based on the interactions, the event manager 106 may determine an expected activity of the user.

According to some implementations, the event manager 206 utilizes historical information to make the determination. The historical information may be used separately or in conjunction with the interaction data. For example, a user may play golf on Saturday morning, and the location of the user is passively gathered. If the user is at the location (e.g., golf course) at a particular time (e.g., between 8 a.m. and 9 a.m.) for at least a threshold number of occurrences (e.g., more than five weeks, more than two months, at least six months, and so forth), the information may be determined to be a habit. Thus, it may be determined by the event manager 206 that next Saturday, the user will be at the same location (e.g., golf course) at the approximate time (e.g., between 8 a.m. and 9 a.m.).

Also included in the system 200 is an evaluation manager 208 that may be configured to identify profile data associated with the identity of the user. The profile data may be identified by the evaluation manager 208 based on the commencement of the first event. For example, it may be determined by the evaluation manager 208 that the first event has commenced based on a determination that the user (e.g., the user device) is located where the first event is to occur (e.g., at the golf course, in a restaurant, at a library, and so on).

According to some implementations, one or more beacons or other manners of detecting the user (e.g., the user device) and associating that user or user device with activities that occur at the first event may be utilized. In such a manner, a third party associated with the event (e.g., a restaurant) may track users and products/services consumed by the user.

The system 200 may also include an authenticator 210 that may be configured to selectively verify the identity of the user based on a mapping between the profile data and data related to the first event. For example, the authenticator 210 may be configured to obtain device information (e.g., Temporary Mobile Subscriber Identity (TMSI), International Mobile Subscriber Identity (IMSI), Internet Protocol (IP) address, and so forth). Thus, the user device may be a device that is bound to the user (e.g., a device previously confirmed to be associated with the user). The data related to the first event may include a location, for example.

An action manager 212 may be configured to trigger an activity associated with a second event. In some implementations, the second event may be triggered after (or at substantially the same time as) the action manager 212 effects completion of a transaction at the first event. In an example, the transaction may be payment to a restaurant after consumption of a meal. In another example, the transaction may be payment to a car service at about the same time as the vehicle arrives at a destination location.

Figure 3:
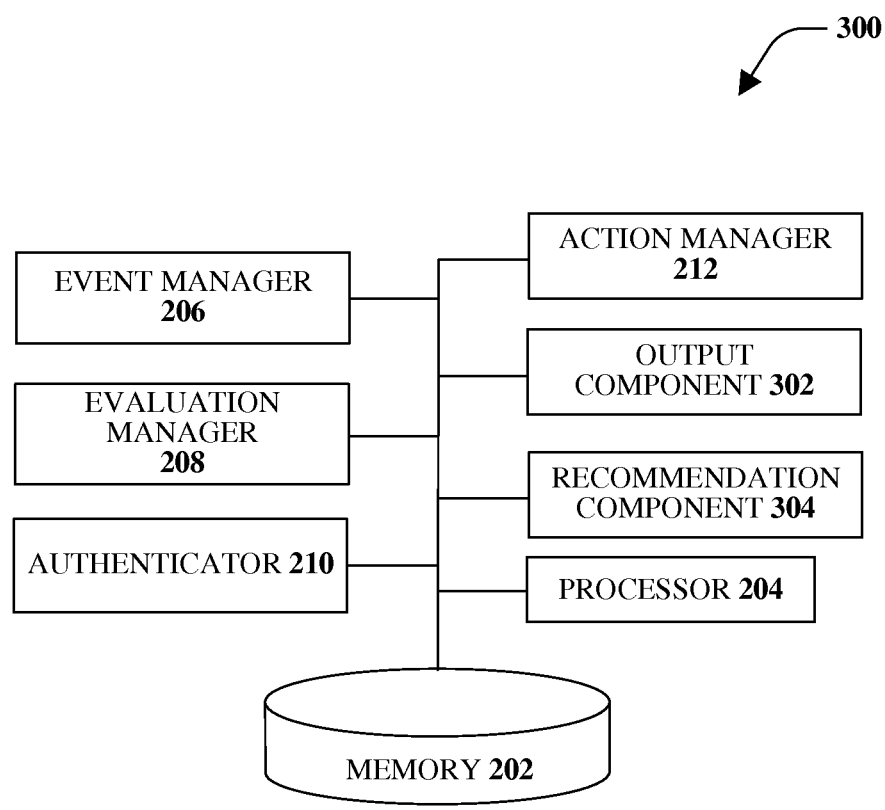
FIG. 3 illustrates an example, non-limiting system configured to enable integration with vertical entities to enable seamless authentication, according to an aspect.

FIG. 3 illustrates an example, non-limiting system 300 configured to enable integration with vertical entities to enable seamless authentication, according to an aspect. As utilized herein the vertical entities reference to customer and merchants associated with the financial entity. For example, a customer of a financial entity may want to make a dinner reservation using a credit card sponsored by the financial entity. In this case, the remainder of the events related to the dinner reservation and thereafter fall into place seamlessly. For example, the events may include the financial entity sending a vehicle service to drive the customer to the restaurant, the dinner bill payment is automated based on the card on file at the restaurant, and so on. Thus, the financial entity may be aware of the geolocation of the user and a rental service vehicle may be sent to pick up the customer after dinner and either proceeds to the next destination or takes the customer home or to another location (e.g., pre-authorized events arranged).

The event manager 206 may be configured to determine that a trigger event has occurred. The trigger event indicates that a first activity has begun. For example, the trigger event may when a user (e.g., as determined by a location of the user device) has arrived at a venue associated with the first activity. In another example, the trigger event may be based on historical information associated with the user. For example, historical information indicates that every Saturday the user leaves for the golf course at 3:30 p.m. Thus, the trigger event may be 3:30 p.m., or a predetermined time before 3:30 p.m. (e.g., five minutes prior, ten minutes prior, and so on).

According to some implementations, the event manager 206 may be configured to schedule a second event based on the commencement of the first event or prior to the commencement of the first event. For example, the trigger event may be the user making reservations at an event. Based on this reservation, the event manager 206 may determine that a second event (or a prior event should occur). For example, the event manager 206 may determine that a vehicle service should be scheduled to pick up the user from the event. In another example, the event manager 206 may determine that a vehicle service should be scheduled to take the user to the event.

The evaluation manager 208 may be configured to identify profile data associated with the identity of the user based on the trigger event. The profile data may include an identification of a mobile device associated with an identity of the user and a location of the mobile device during the first event. The authenticator 210 may be configured to verify the identity of the user if the identification of the mobile device and the location conform to an expected identification and an expected location.

The action manager 212 may be configured to trigger an activity associated with the second event. For example, the event manager 206 may be configured to schedule a third event to be triggered by the action manager 212 after completion of a transaction associated with the second event. For example, the first event, the second event, and the third event may occur in sequence within a defined time period.

According to some implementations, the action manager 212 may effect completion of the transaction at the first event. The completion of the transaction may be based on performing a monetary exchange from an account associated with the identity of the user and into another financial account associated with a third party (e.g., the merchant) associated with the first event. The monetary exchange may be conducted over a wireless communications network. In an example, the third party may be a restaurant, a vehicle service, or another business that provided a product and/or service consumed by the user.

An output component 302 may be configured to activate an electronic notification to the user based on an indication that a transaction has been completed at the first event. The electronic notification may be activated over a wireless communications network. For example, the wireless communications network may include a wireless link between an electronic server associated with the financial entity and the user device.

According to an implementation, the action manager 212 may be configured to effect completion at the first event based on a confirmation that the first event should end. Continuing the restaurant example, the user may be at the restaurant for any length of time (e.g., 20 minutes, 1 hour forty-three minutes, and so on). Thus, the confirmation may be a user indicating that the user would like to leave. In another example, the confirmation may be automatic based on payment of the restaurant bill. Further to this example, the restaurant may convey the bill for payment, wherein the bill is automatically paid according to the various aspects herein.

The system 300 may also include a recommendation component 304 that may be configured to output a suggested action based on the trigger event. The recommendation component 304 may determine the suggested action based on historical information associated with the identity of the user. For example, the suggested action may relate to a health condition related to the user. In some cases, the recommended action may be output prior to the user arriving at the first event. For example, the user is planning to attend an outdoor sporting event and the user has pollen allergies. In this case, the recommendation component 304 may remind the user to take an allergy medicine prior to leaving for the event. This information may be determined based on historical information obtained about the user (e.g., the user has previously purchased allergy pills), based on information provided by the user, or based on other parameters.

According to some implementations, the output component 302, the recommendation component 304, and other interface components discussed herein, may provide a graphical user interface (GUI), a command line interface, a speech interface, Natural Language text interface, and the like. For example, a GUI may be rendered that provides a user with a region or means to load, import, select, read, and so forth, various requests and may include a region to present the results of the various requests. These regions may include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, may be employed. Thus, it might be inferred that the user did want the action performed.

The user may also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, may be employed subsequent to entering the information in order to initiate information conveyance. However, it is to be appreciated that the disclosed aspects are not so limited. For example, merely highlighting a check box may initiate information conveyance. In another example, a command line interface may be employed. For example, the command line interface may prompt the user for information by providing a text message, producing an audio tone, or the like. The user may then provide suitable information, such as alphanumeric input corresponding to an option provided in the interface prompt or an answer to a question posed in the prompt. It is to be appreciated that the command line interface may be employed in connection with a GUI and/or API. In addition, the command line interface may be employed in connection with hardware (e.g., video cards) and/or displays (e.g., black and white, and EGA) with limited graphic support, and/or low bandwidth communication channels.

Figure 4:
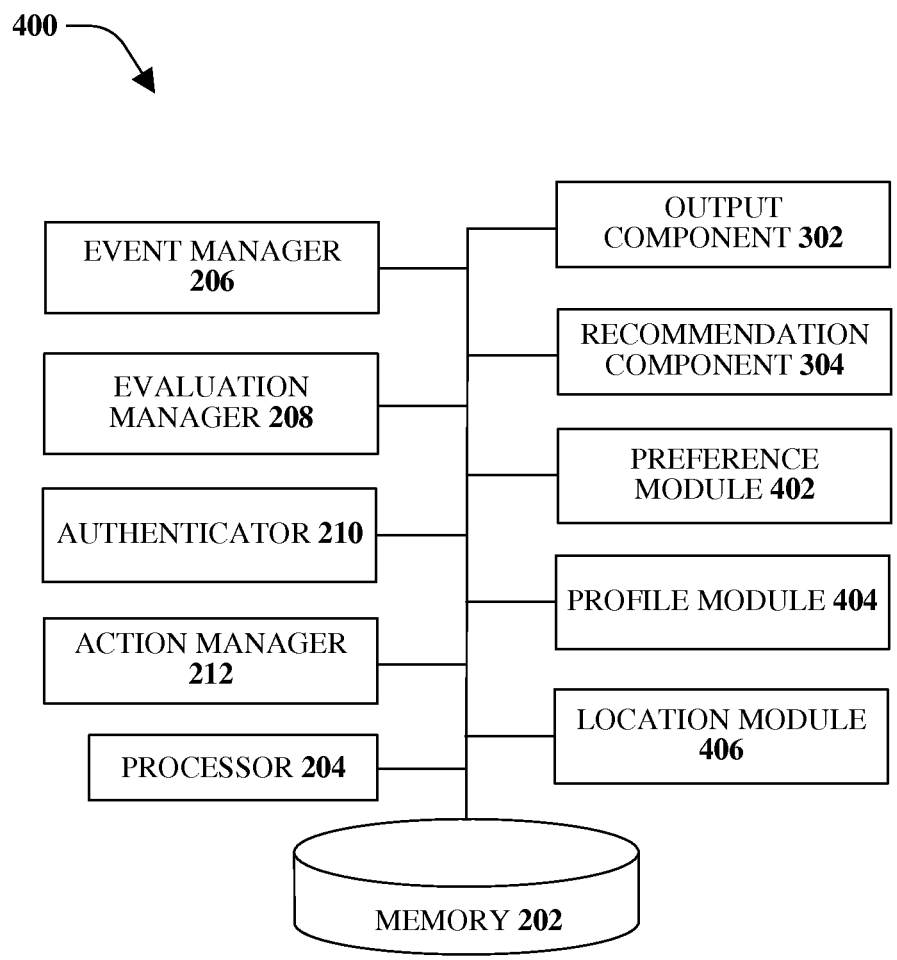
FIG. 4 illustrates an example, non-limiting system that utilizes user data to provide value-added services, according to an aspect.

FIG. 4 illustrates an example, non-limiting system 400 that utilizes user data to provide value-added services, according to an aspect. The various aspects discussed herein interconnect multiple domains. As used herein domains may be defined as various categories of items that a user does or that a user prefers. For example, domains may include categories such as "shopping," "favorite restaurants," "favorite sports teams," "certain habits," "favorite sport I play," "favorite restaurants I go to," "things I like to do as a hobby," and so on. There may be many domains and some domains may overlap, at least in part.

As a user utilizes their device, a financial entity may gather information about that person, such as when a financial application or another application is being utilized (e.g., is running or executing on the user device). However, there are multiple activities happening outside the application world and these other activities are also important. For example, a user may initiate a search within the application and, thereafter, may perform activities that follow without the user being engaged in the application.

By way of example and not limitation, a user is visiting a city on a business trip. According to an implementation, the user device seamlessly, based on time (e.g., close to dinnertime) and location where the user is located, may provide the top restaurants. According to some implementations, the top restaurants may be those restaurants that have a relationship with a financial entity sponsoring the service. However, the various aspects discussed herein are not limited to this implementation and, instead, the top restaurants may be restaurants that do not have a relationship with the financial entity. According to some implementations, at least a first subset of the restaurants provided may have a relationship with the financial entity while a second subset (that does not include the first subset) do not have a relationship with the financial entity.

Further, the recommendation may be based on a profile of the user and/or behaviors of the user. For example, if the user likes to eat Indian food, the top restaurants may include only those restaurants that serve Indian food. Thus, recommendations are provided that are relevant to the user. Accordingly, the system 400 may be configured to understand the user and understand the user's behavior.

A preference module 402 may be configured to retain information related to preferences of the user. For example, the user (e.g., customer) may establish a profile of preferred merchants, preferred method(s) of payment, desired services, and so on. According to some implementations, the preferences of the user may be gathered by the preference module 402 based on observations of the user over days, weeks, months, and so on. For example, if the user visits a retailer more often than other retailers, it may be inferred by the preference module 402 that the user prefers that retailer.

A profile module 404 may be configured to retain information related to the relationship between the user, the financial entity, and/or one or more merchants. For example, the relationship may be a customer/service provider relationship. In another example, the relationship may be a business-to-business relationship. In another example, the relationship may be both a customer/service provider relationship and a business-to-business relationship.

In accordance with some aspects, the profile module 404 may include information related to whether a user has opted-into, or opted-out of the service. In the situation where the user has opted out of the service, the information related to the user might not be collected and the user might not receive any value-added services related to the seamless life. In the situation where the user has opted-into the service, the value-added services may be provided as discussed herein.

A location module 406 may be configured to determine a current location of the user (and the user device). According to some implementations, the location module 406 may be configured to determine a future or expected location of the user (and the user device).

Thus, when a customer sets up a profile (or at another time) of preferred merchants, method of payment, and desired goods and/or services, the disclosed aspects may be dynamically implemented. Thus, based on geolocation, appointment of event trigger or activation of a request, the profile and defined actions may be executed.

For example, a customer would like to go to dinner on a certain date and time. Currently the customer is located in her home city and selects a restaurant from her home location. The profile is executed, by the profile module 404, and a reservation is made with confirmation. Further, a customer car service is scheduled. In addition, payment authorization for the car and the restaurant is included. When services are used, payment is made, which may include predefined tip. The payment may be triggered by the merchant consistent with the reservation date.

This may be seamless for the user. The system gathers input and information data about the user and the system processes the information to determine appropriate actions and/or appropriate recommendations for the user. When the user reserves a table at a restaurant, it may lead to numerous other things (e.g., different domains). Further, when the meal is over, the user does not have to pull out their wallet to pay, it is performed seamlessly or dynamically based on the reservation. Thus, money may move from the user's checking account, credit card, or other payment instrument selected by the user as a default payment method or specific for one or more specific transactions. For example, the user may need a car, and seamlessly (without interaction from the user), the car arrives at the restaurant and the user is informed that the car is waiting.

Thus, the data available for the customer may be utilized to make the customer's life a little easier. Further, the data available may be related to automatic payments, which makes transactions seamless based on the customer's patterns, behaviors, preferences, and other inferred information.

The various aspects discussed herein may be expanded to the internet of things. For example, a user may get into their vehicle and may be authenticated. Based on historical information, the vehicle may know where that user is going (e.g., Monday through Friday at 7:00 a.m. the user leaves for work). In another example, every morning the user may leave the house and pick up coffee. In some implementations, the vehicle may interact with the driver rather than automatically performing the function. An interaction may be, "Do you want to stop at coffee shop?" or "Are you ready to go to the office?" Based on the response, the vehicle may be self-driven rather than the user needing to think about where they may be going. Thus, the various aspects review history, preferences, and other information known about the user.

As discussed, the various aspects may utilize preference, profile, and location to automatically perform one or more actions. Starting with a user profile, there are some preferences that are applied, and, further, a current location is applied. For example, the user may be a customer of a financial entity, which also has merchants that utilize the financial entity. The merchants may be connected with the customer based on a service offering provided by the financial entity to the merchant. Further, the merchant (e.g., corporate customer) may be connected to other merchants that bank with the financial entity and that provide a good/service that would be of interest to the customer (including the corporate customer). Thus, according to the various aspects disclosed herein, there is a direct connection between the customer and the merchant.

According to an example implementation, the customer is going out of town for a meeting, therefore, the recommendation component 304 provides a recommendation for a restaurant. The recommendation may be based on information determined by the preference module 402, the profile module 404, and/or the location module 406. Thus, when information is known about the user, various suggestions may be made and/or various actions may be automatically implemented. If the user accepts the suggestion, everything after that should be seamless from at least a payment perspective.

As an example of value added services, a personal assistant (e.g., incorporated in the various aspects discussed herein) interconnects various items for the user. A profile may be built that indicates that every Saturday the user plays golf. The personal assist may search and fetch the best golf deal around the user's home or where the user is currently located (e.g., on vacation). The system may pay for the round of golf, which allows the user to just show up and play without thinking about payment. Even before showing up, the personal assistant may remind the user to take an allergy pill so that she is not miserable on the golf course. Thus, the various aspects may be interrelated.

Figure 5:
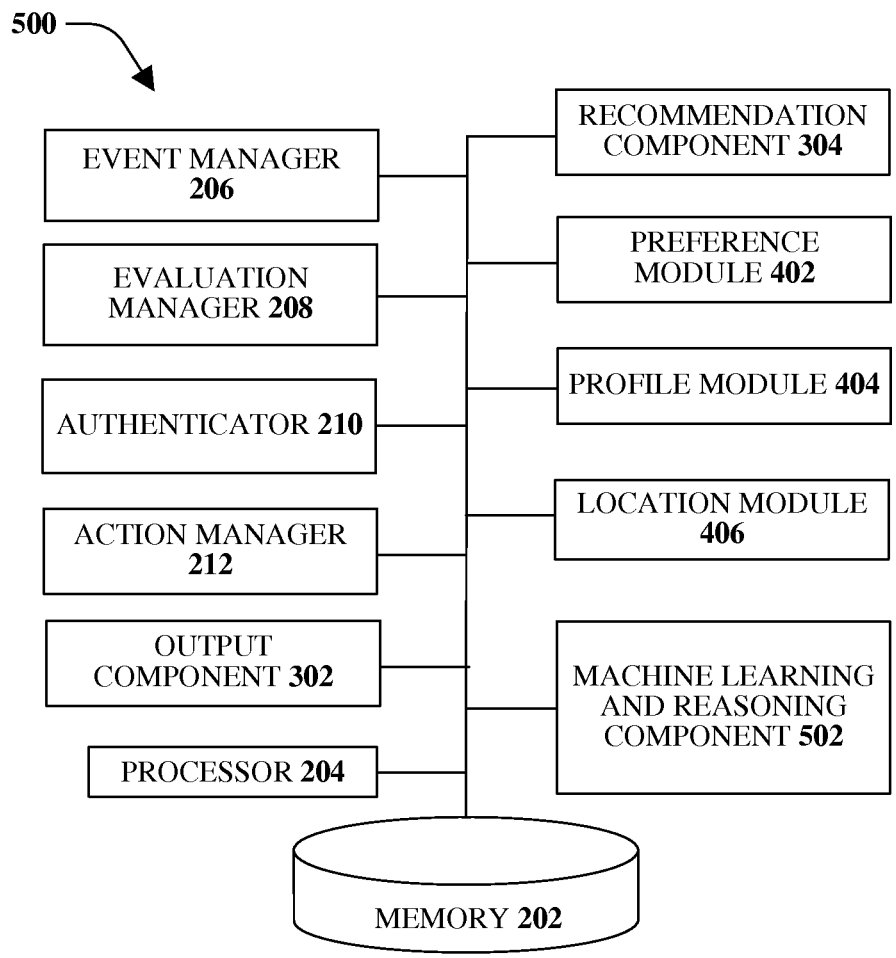
FIG. 5 illustrates an example, non-limiting system that employs automated learning to facilitate one or more of the disclosed aspects.

FIG. 5 illustrates an example, non-limiting system 500 that employs automated learning to facilitate one or more of the disclosed aspects. For example, a machine learning and reasoning component 502 may be utilized to automate one or more of the disclosed aspects. The machine learning and reasoning component 502 may employ automated learning and reasoning procedures (e.g., the use of explicitly and/or implicitly trained statistical classifiers) in connection with providing value-added services in a seamless life format in accordance with one or more aspects described herein.

For example, the machine learning and reasoning component 502 may employ principles of probabilistic and decision theoretic inference. Additionally or alternatively, the machine learning and reasoning component 502 may rely on predictive models constructed using machine learning and/or automated learning procedures. Logic-centric inference may also be employed separately or in conjunction with probabilistic methods.

The machine learning and reasoning component 502 may infer actions or events that should be implemented by obtaining knowledge about related actions or events. The related actions or events may be those events historically performed together (e.g., at substantially the same time) by the user. According to some implementations, the related actions or events may be based on knowledge about the user (e.g., medical conditions, preferences, and so on). Based on the various forms of knowledge, the machine learning and reasoning component 502 may make an inference based on which actions/events to recommend, which actions/events to automatically implement, when to implement the actions/events, or combinations thereof.

As used herein, the term "inference" refers generally to the process of reasoning about or inferring states of the system, a component, a module, the environment, and/or user devices from a set of observations as captured through events, reports, data and/or through other forms of communication. Inference may be employed to identify a specific context or action, or may generate a probability distribution over states, for example. The inference may be probabilistic. For example, computation of a probability distribution over states of interest based on a consideration of data and/or events. The inference may also refer to techniques employed for composing higher-level events from a set of events and/or data. Such inference may result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) may be employed in connection with performing automatic and/or inferred action in connection with the disclosed aspects.

If the machine learning and reasoning component 502 has uncertainty related to whether a certain action and/or event should be implemented, the machine learning and reasoning component 502 may automatically engage in a short (or long) dialogue or interaction with the user. In accordance with some aspects, the machine learning and reasoning component 502 engages in the dialogue with the user through another system component. Computations of the value of information may be employed to drive the asking of questions.

The various aspects (e.g., in connection with automatic implementation of various portions of actions/events, completion of a prior action/event, and so forth) may employ various artificial intelligence-based schemes for carrying out various aspects thereof. For example, a process for determining if a particular action should follow a current action may be enabled through an automatic classifier system and process.

A classifier is a function that maps an input attribute vector, $x=(x1, x2, x3, x4, xn)$, to a confidence that the input belongs to a class. In other words, $f(x)=confidence(class)$. Such classification may employ a probabilistic and/or statistical-based analysis (e.g., factoring into the analysis utilities and costs) to prognose or infer an action that should be employed to determine what actions should be automatically performed what actions should be performed after receiving confirmation from the user to proceed. In the case of actions/events, for example, attributes may be identification of a user device and/or the user and the classes are criteria related to known information (e.g., historical information) about the user device and/or user.

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression that is utilized to develop models of priority.

One or more aspects may employ classifiers that are explicitly trained (e.g., through a generic training data) as well as classifiers that are implicitly trained (e.g., by observing fraud trends, by receiving extrinsic information, and so on). For example, SVM's may be configured through a learning or training phase within a classifier constructor and feature selection module. Thus, a classifier(s) may be used to automatically learn and perform a number of functions, including but not limited to determining according to a predetermined criteria when to provide a suggested action (e.g., take medication), when to complete a current action, which actions to implement in sequence, and so forth. The criteria may include, but is not limited to, historical information, user preferences, expected actions, and so forth.

Additionally or alternatively, an implementation scheme (e.g., a rule, a policy, and so on) may be applied to control and/or regulate events and resulting recommendations, subsequent events, and so forth. In some implementations, based upon a predefined criterion, the rules-based implementation may automatically and/or dynamically implement one or more portions of an event/action. In response thereto, the rule-based implementation may automatically interpret and carry out functions associated with the event/action by employing a predefined and/or programmed rule(s) based upon any desired criteria.

Methods that may be implemented in accordance with the disclosed subject matter will be better appreciated with reference to the flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the disclosed methods. It is to be appreciated that the functionality associated with the blocks may be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods might alternatively be represented as a series of interrelated states or events, such as in a state diagram.

Figure 6:
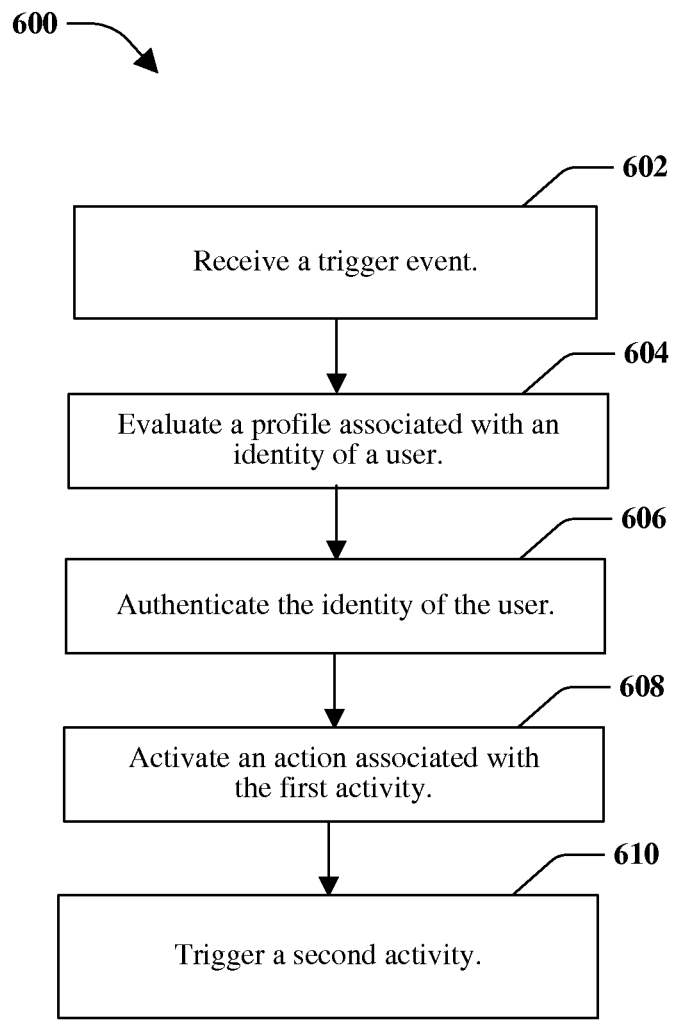
FIG. 6 illustrates an example, non-limiting method for providing value-added services, according to an aspect.

FIG. 6 illustrates an example, non-limiting method 600 for providing value-added services, according to an aspect. The method 600 in FIG. 6 may be implemented using, for example, any of the systems, such as the system 200 (of FIG. 2), described herein.

Method 600 starts at 602 when a trigger event that relates to initiation of a first activity is received. The trigger event may be based upon a user entering information into an electronic calendar or scheduling assistant. In another example, the trigger event may be the user arriving at a destination (e.g., a sporting event).

At 604, a profile associated with an identity of the user is evaluated. The user may be the user for which the trigger event was received. Further, at 606, the identity of the user is authenticated for the first activity. The authentication may be based on an expected match between the profile and data related to the first activity. For example, the authentication may be based on the user being the expected user and the location where the user is at being the location where the event was expected to occur.

At 608, an action associated with the first activity is activated. The activation may be based on the authentication. The action may be associated with a third party. Further, the action may be activated without user interaction. For example, the action may be payment of a restaurant bill and the third party is the restaurant. Thus, the activation may cause an external device (e.g., associated with the restaurant in this example) to receive payment and notify the staff at the restaurant that the bill has been paid.

A second activity is triggered, at 610, based on the action being activated. The triggering of the second activity may be performed without user interaction. In an example, the second activity may be a vehicle service being called after payment of a restaurant bill.

Figure 7:
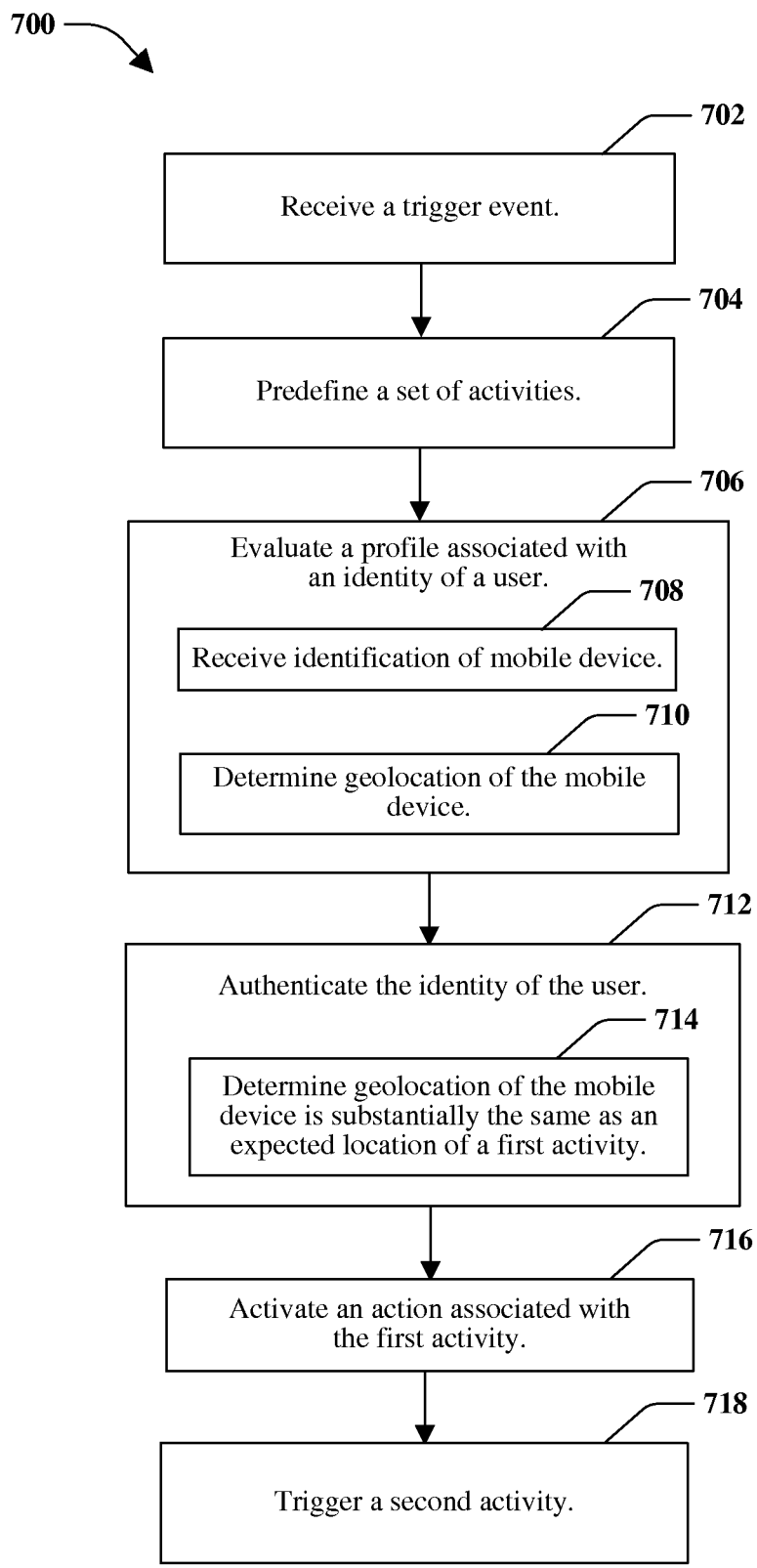
FIG. 7 illustrates an example, non-limiting method for providing value-added services in a seamless life format, according to an aspect.

FIG. 7 illustrates an example, non-limiting method 700 for providing value-added services in a seamless life format, according to an aspect. The method 700 in FIG. 7 may be implemented using, for example, any of the systems, such as the system 300 (of FIG. 3), described herein.

Method 700 starts, at 702, when a trigger event is received. The trigger event may be an indication that the user plans to perform an action in the future. In another example, the trigger event may be an indication that the user has arrived at a location.

According to an implementation, the method may include outputting a recommended action based on the trigger event. The recommended action may be determined based on historical information associated with the user. In an example, the recommended action relates to a health condition of the user. In another example, the recommended action relates to someone else that is associated with the user (e.g., a family member). For example, the recommendation may be to tell your wife "Happy Birthday" before leaving for work. In another example, the recommendation may be to do an activity that is on the user's to do list, such as to call the plumber today.

At 704, a set of activities are predefined. The activities may be predefined based on a user data associated with an identity of the user. Further, the set of activities may include a first activity and at least a second activity. The identity of the user may be included in a user profile. According to some implementations, the activities are predefined before the trigger event is received (e.g., before the user arrives at the restaurant).

A profile associated with the user (e.g., the identity of the user) is evaluated at 706. According to an implementation, evaluating the profile may include receiving an identification of a mobile device, at 708. The mobile device is the device associated with the identity of the user (e.g., the expected mobile device). At 710, a geolocation of the mobile device is determined. The geolocation may be determined utilizing various location determination mechanisms, according to an aspect.

At 712, the identity of the user is authenticated. According to an implementation, the authentication may include determining, at 714, that the geolocation of the mobile device is substantially the same as an expected location of the first activity.

An action associated with the first activity is activated, at 716. According to an implementation, the activation includes effecting payment to the third party. The third party may be a merchant associated with the first activity. Thus, an indication is provided on a device of the merchant that the payment was made and monies transferred. Further, an indication may be output to the user that informs the user that the action has been completed.

A second activity may be triggered, at 718. The second activity may be included in the set of predefined activities. Further, the second activity may be triggered based on a determination that the action, at 716, has been completed.

Figure 8:
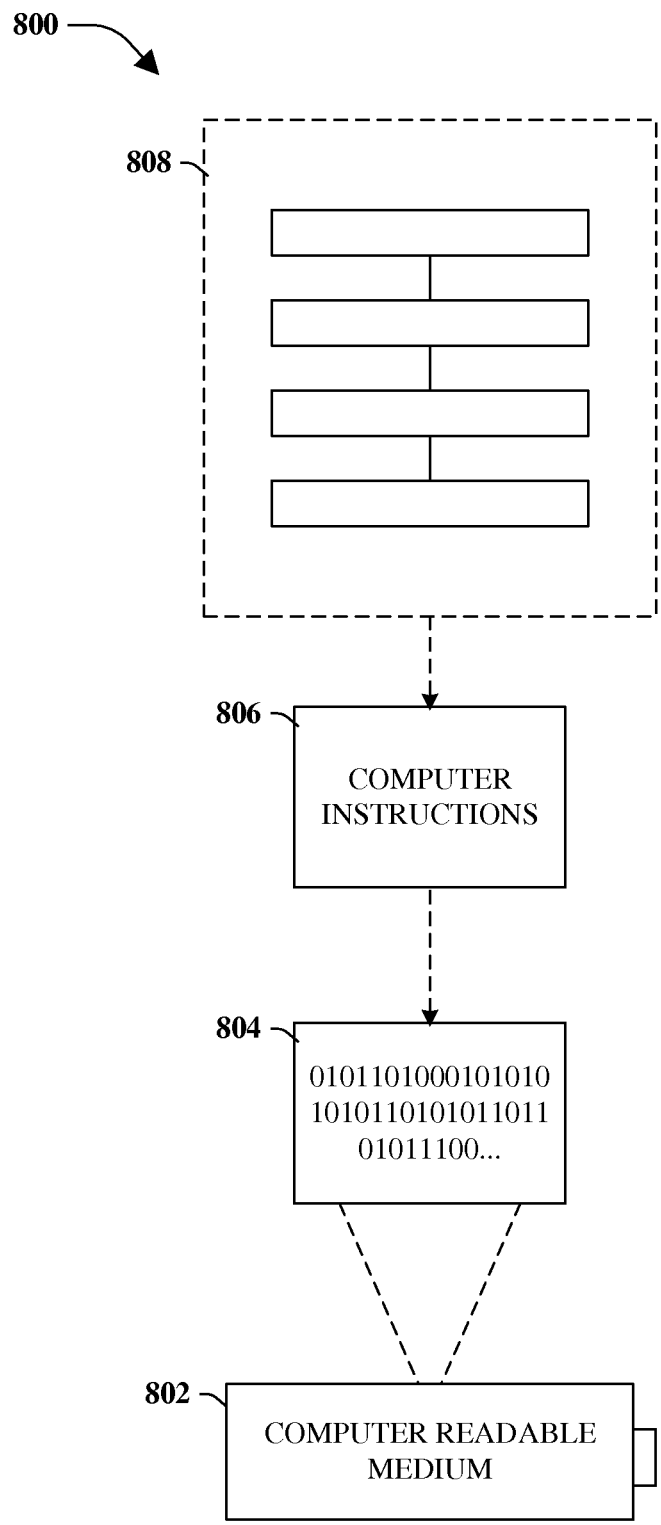
FIG. 8 illustrates an example, non-limiting computer-readable medium or computer-readable device including processor-executable instructions configured to embody one or more of the aspects set forth herein.

One or more implementations include a computer-readable medium including processor-executable instructions configured to implement one or more embodiments presented herein. An embodiment of a computer-readable medium or a computer-readable device devised in these ways is illustrated in FIG. 8, wherein an implementation 800 includes a computer-readable medium 802, such as a CD-R, DVD-R, flash drive, a platter of a hard disk drive, and so forth, on which is encoded computer-readable data 804. The computer-readable data 804, such as binary data including a plurality of zero's and one's as illustrated, in turn includes a set of computer instructions 806 configured to operate according to one or more of the principles set forth herein.

In the illustrated embodiment 800, the processor-executable computer instructions 806 may be configured to perform a method 808, such as the method 600 of FIG. 6 and/or the method 700 of FIG. 7, for example. In another embodiment, the processor-executable instructions 804 may be configured to implement a system, such as the system 200 of FIG. 2 and/or the system 300 of FIG. 3, for example. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 9:
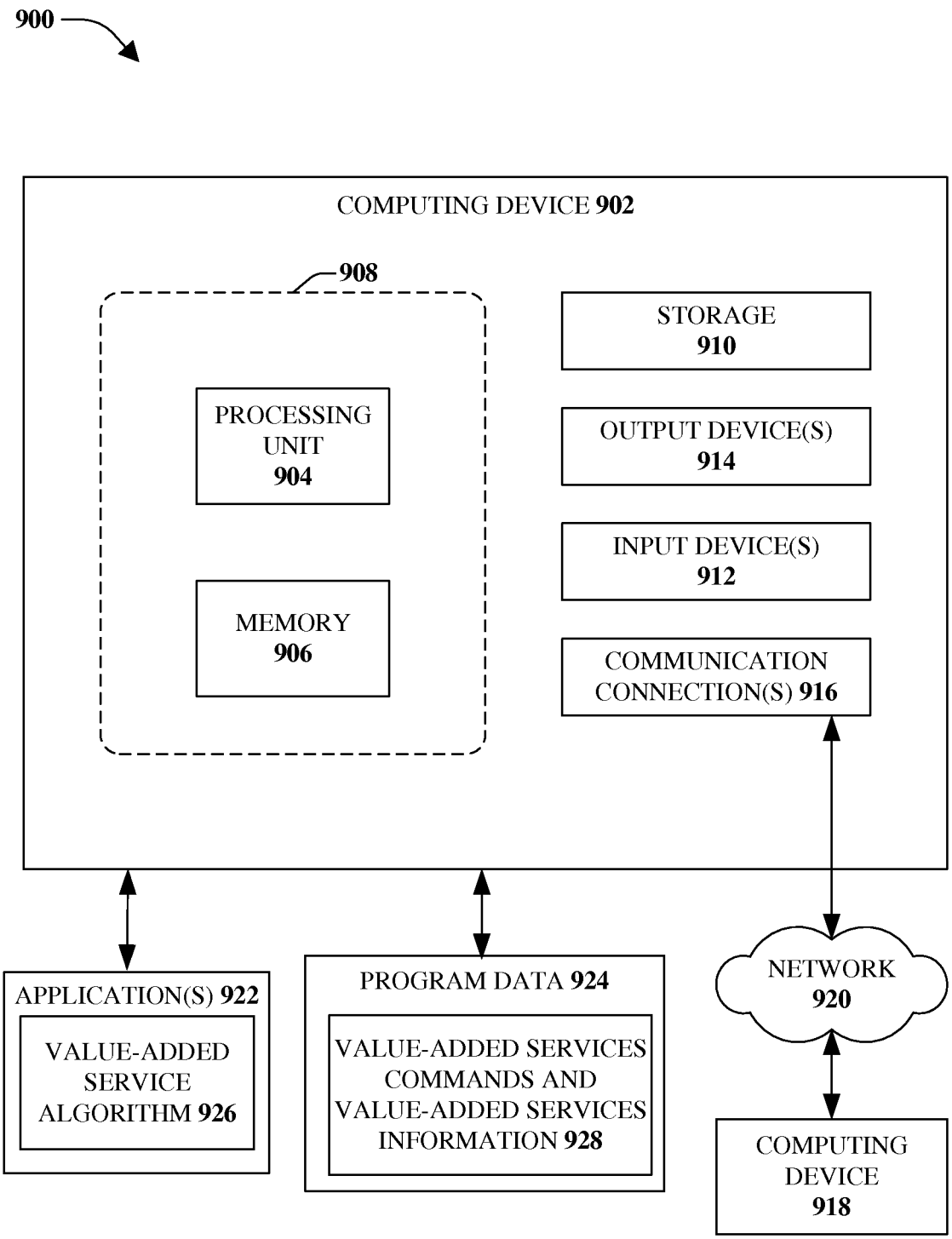
FIG. 9 illustrates an example, non-limiting computing environment where one or more of the aspects set forth herein are implemented, according to one or more aspects.

FIG. 9 and the following discussion provide a description of a suitable computing environment to implement embodiments of one or more of the aspects set forth herein. The operating environment of FIG. 9 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 9 illustrates a system 900 that may include a computing device 902 configured to implement one or more embodiments provided herein. In one configuration, the computing device 902 may include at least one processing unit 904 and at least one memory 906. Depending on the exact configuration and type of computing device, the at least one memory 906 may be volatile, such as RAM, non-volatile, such as ROM, flash memory, etc., or a combination thereof. This configuration is illustrated in FIG. 9 by dashed line 908.

In other embodiments, the device 902 may include additional features or functionality. For example, the device 902 may include additional storage such as removable storage or non-removable storage, including, but not limited to, magnetic storage, optical storage, etc. Such additional storage is illustrated in FIG. 9 by storage 910. In one or more embodiments, computer readable instructions to implement one or more embodiments provided herein are in the storage 910. The storage 910 may store other computer readable instructions to implement an operating system, an application program, etc. Computer readable instructions may be loaded in the at least one memory 906 for execution by the at least one processing unit 904, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The device 902 may include input device(s) 912 such as keyboard, mouse, pen, voice input device, touch input device, infrared cameras, video input devices, or any other input device. Output device(s) 914 such as one or more displays, speakers, printers, or any other output device may be included with the device 902. The input device(s) 912 and the output device(s) 914 may be connected to the device 902 via a wired connection, wireless connection, or any combination thereof. In one or more embodiments, an input device or an output device from another computing device may be used as the input device(s) 912 and/or the output device(s) 914 for the device 902. Further, the device 902 may include communication connection(s) 916 to facilitate communications with one or more other devices, illustrated as a computing device 918 coupled over a network 920.

One or more applications 922 and/or program data 924 may be accessible by the computing device 902. According to some implementations, the application(s) 922 and/or program data 924 are included, at least in part, in the computing device 902. The application(s) 922 may include a value-added service algorithm 926 that is arranged to perform the functions as described herein including those described with respect to the value-added services system 400 of FIG. 4. The program data 924 may include value-added services commands and value-added services information 928 that may be useful for operation with value-added services that provide a seamless life as described herein.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system, comprising:
   a processor that executes the following computer executable components stored in a memory:
   an event manager that determines commencement of a first event based on scheduled event data or historical information associated with an identity of a user, wherein the historical information indicates a determined habit of the user, wherein determining the habit includes determining that a number of instances of past behavior exceeds a predefined threshold number;
   an evaluation manager that identifies profile data associated with the identity of the user based on the commencement of the first event;
   an authenticator that selectively verifies the identity of the user based on a mapping between the profile data and data related to the first event;
   a machine learning and reasoning component that:
   identifies related events historically performed at a same time by the user; and
   identifies, based on the related events, a second event to execute upon completion of the first event; and
   an action manager that triggers and executes the second event upon effecting completion of a first transaction at the first event,
   wherein executing the second event comprises the action manager instructing a second system to perform the second event, wherein the second system performs the second event, and wherein performing the second event includes completing a second transaction for the second event;
   wherein the action manager effects completion of the first transaction of the first event by dynamically executing a monetary exchange from an account associated with the identity of the user into another financial account associated with a third party associated with the first event without user intervention, and
   wherein the monetary exchange is conducted over a wireless communications network.

2. The system of claim 1, wherein the event manager schedules the second system to perform the second event based on the commencement of the first event or prior to the commencement of the first event.

3. The system of claim 2, wherein the event manager schedules a third event that is triggered by the action manager after completion of the second transaction at the second event, wherein the first event, the second event, and the third event occur in sequence within a defined time period.

4. The system of claim 1, wherein the profile data includes an identification of a mobile device associated with the identity of the user and a location of the mobile device during the first event, the authenticator verifies the identity of the identification of the mobile device and the location conform to an expected identification and an expected location.

5. The system of claim 1, further comprising a recommendation component that outputs a suggested action based on the first event.

6. The system of claim 5, wherein the recommendation component determines the suggested action based on historical information associated with the identity of the user.

7. The system of claim 5, wherein the suggested action relates to a health condition related to the user.

8. The system of claim 1, further comprising an output component that activates an electronic notification to the user based on an indication of the first transaction at the first event, the electronic notification is activated over a wireless communications network.

9. The system of claim 1, wherein the action manager effects completion of the first transaction at the first event based on a confirmation that the first event should end.

10. The system of claim 1, wherein the first event comprises an activity at a location, wherein the second system comprises a transportation system, and wherein the second event comprises sending a transportation vehicle to the location.

11. A method, comprising:
receiving, by a system comprising a processor, a trigger event that relates to commencement of a first event based on scheduled event data and historical data, wherein the historical data indicates a determined habit of a user as the first event, wherein determining the habit includes determining that a number of instances of past behavior exceeds a predefined threshold number;
evaluating, by the system, a profile associated with an identity of a user for which the trigger event was received;
authenticating, by the system, the identity of the user for the first event based on an expected match between the profile and data related to the first event;
identifying, by the system using a machine learning and reasoning component, related events historically performed at a same time by the user;
identifying, by the system using the machine learning and reasoning component based on the related events, a second event to execute upon completion of the first event;
triggering and executing, by the system the second event upon effecting completion of a first transaction at the first event, wherein executing the second event comprises instructing a second system to perform the second event, wherein the second system performs the second event, wherein performing the second event comprises completing a second transaction for the second event,
wherein effecting completion of the first transaction of the first event comprises dynamically executing a monetary exchange from an account associated with the identity of the user into another financial account associated with a third party associated with the first event without user intervention, and
wherein the monetary exchange is conducted over a wireless communications network.

12. The method of claim 11, further comprising predefining, by the system, a set of activities based on user data associated with the identity of the user, wherein the set of activities comprises the first event and the second event and the user data includes the profile.

13. The method of claim 11, wherein the evaluating the profile comprises:
receiving an identification of a mobile device associated with the identity of the user; and
determining a geolocation of the mobile device.

14. The method of claim 13, wherein the authenticating comprises determining the geolocation of the mobile device is substantially the same as an expected location of the first event.

15. The method of claim 11, further comprising outputting, by the system, a recommended action based on the trigger event, wherein the recommended action is determined based on historical information associated with the identity of the user.

16. The method of claim 11, further comprising outputting, by the system, a recommended action based on the trigger event, wherein the recommended action relates to a health condition of the user.

17. A non-transitory computer-readable storage device storing executable instructions that, when executed by a processing device, cause a system comprising the processing device to perform operations, comprising:
determining a start of a first event based on scheduled event data and historical information associated with an identity of a user, wherein the historical information indicates a determined habit of the user, wherein determining the habit includes determining that a number of instances of a past behavior exceeds a predefined threshold number;
identifying profile data associated with the identity of the user based on the start of the first event;
verifying the identity of the user based on a mapping between the profile data and data related to the first event;
identifying using a machine learning and reasoning component, related events historically performed at a same time by the user;
identifying, using the machine learning and reasoning component based on the related events, a second event to execute upon completion of the first event; and
triggering and executing the second event after effecting completion of a first transaction at the first event, wherein executing the second event comprises instructing a second system to perform the second event, wherein the second system performs the second event, and wherein performing the second event includes completing a second transaction for the second event,
wherein effecting completion of the first transaction at the first event comprises dynamically executing a monetary exchange from an account associated with the identity of the user into another financial account associated with a third party associated with the first event without user intervention, and
wherein the monetary exchange is conducted over a wireless communications network.

18. The non-transitory computer-readable storage device of claim 17, wherein the operations further comprise activating on a user device a suggested action based on the first event, wherein the suggested action is not a component of the first event or the second event and is based on historical information associated with the identity of the user.

* * * * *